United States Patent
Zhang et al.

(10) Patent No.: US 9,582,885 B2
(45) Date of Patent: Feb. 28, 2017

(54) ZONAL UNDERGROUND STRUCTURE DETECTION METHOD BASED ON SUN SHADOW COMPENSATION

(71) Applicant: HUAZHONG UNIVERSITY OF SCIENCE AND TECHNOLOGY, Wuhan, Hubei (CN)

(72) Inventors: Tianxu Zhang, Hubei (CN); Longwei Hao, Hubei (CN); Wenxuan Ma, Hubei (CN); Cen Lu, Hubei (CN); Heng Yao, Hubei (CN); Yuehuan Wang, Hubei (CN); Nong Sang, Hubei (CN); Weidong Yang, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/106,686

(22) PCT Filed: Feb. 10, 2015

(86) PCT No.: PCT/CN2015/072663
§ 371 (c)(1),
(2) Date: Jun. 20, 2016

(87) PCT Pub. No.: WO2016/106950
PCT Pub. Date: Jul. 7, 2016

(65) Prior Publication Data
US 2016/0371841 A1    Dec. 22, 2016

(30) Foreign Application Priority Data
Dec. 30, 2014    (CN) .......................... 2014 1 0844578

(51) Int. Cl.
G06T 7/00    (2006.01)
G01V 9/00    (2006.01)
(Continued)

(52) U.S. Cl.
CPC ............. *G06T 7/0042* (2013.01); *G01V 9/005* (2013.01); *G06K 9/4652* (2013.01); *G06T 7/60* (2013.01);
(Continued)

(58) Field of Classification Search
None
See application file for complete search history.

(56) References Cited

U.S. PATENT DOCUMENTS 8,288,726 B2 * 10/2012 Weil ...................... G01N 25/72
250/338.1

FOREIGN PATENT DOCUMENTS

CN    2006011832    1/2006
CN    1845088    10/2006
(Continued)

*Primary Examiner* — Gandhi Thirugnanam
*Assistant Examiner* — Jiangeng Sun
(74) *Attorney, Agent, or Firm* — Hamre, Schumann, Mueller & Larson, P.C.

(57) ABSTRACT

A zonal underground structure detection method based on sun shadow compensation is provided, which belongs to the crossing field of remote sensing technology, physical geography and pattern recognition, and is used to carry out compensation processing after a shadow is detected, to improve the identification rate of zonal underground structure detection and reduce the false alarm rate. The present invention comprises steps of acquiring DEM terrain data of a designated area, acquiring an image shadow position by using DEM, a solar altitude angle and a solar azimuth angle, processing and compensating a shadow area, and detecting a zonal underground structure after the shadow area is corrected. In the present invention, the acquired DEM terrain data is used to detect the shadow in the designated area; and the detected shadow area is processed and compensated, to reduce influence of the shadow area on zonal underground structure detection; finally, the zonal under-
(Continued)

ground structure is detected by using a remote sensing image after shadow compensation, so that the accuracy of zonal underground structure detection is improved and the false alarm rate is reduced compared with zonal underground structure detection using a remote sensing image without shadow compensation processing.

10 Claims, 7 Drawing Sheets

(51) Int. Cl.
    *G06K 9/46*     (2006.01)
    *G06T 7/60*     (2006.01)

(52) U.S. Cl.
    CPC ............... *G06T 2207/10032* (2013.01); *G06T 2207/10048* (2013.01)

(56) References Cited

FOREIGN PATENT DOCUMENTS

| | | |
|---|---|---|
| CN | 101030301 | 9/2007 |
| CN | 101034475 | 9/2007 |
| CN | 101034477 | 9/2007 |
| CN | 102622738 | 8/2012 |

* cited by examiner

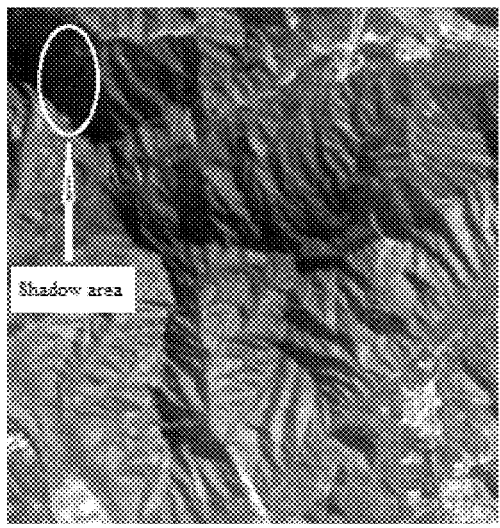 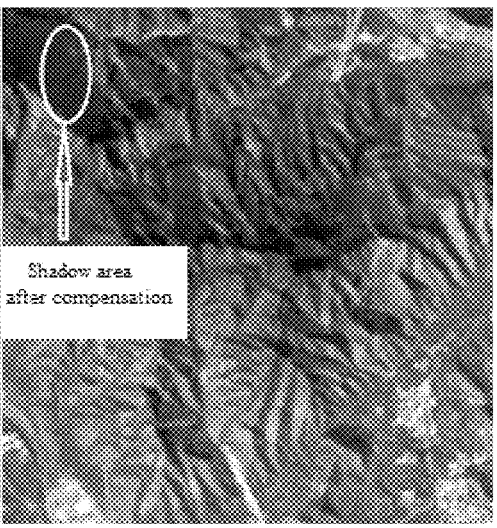
Fig. 10(a)  Fig. 10(b)
Fig. 11(a)  Fig. 11(b)

ZONAL UNDERGROUND STRUCTURE DETECTION METHOD BASED ON SUN SHADOW COMPENSATION

TECHNICAL FIELD

The present invention relates to the interdisciplinary field of remote sensing technology, image processing, and pattern recognition, and in particular, to a zonal underground structure detection method based on sun shadow compensation.

BACKGROUND ART

Shadow is a common physical phenomenon in nature, and is generated when a light source is blocked by an object. A shadow in an image has different effects on related issues in the field of computer vision, including positive and negative effects. For example, adding shadows to objects in virtual reality and 3D games can improve the sense of reality of a scene, but in more cases, a shadow in an image has a negative effect on related issues in computer vision. For example, in a remote sensing image, a shadow affects many subsequent processing operations on the remote sensing image, such as image matching, pattern recognition, and surface feature extraction. In video surveillance, the combination of a shadow and a moving target results in an error when the computer extracts and tracks the target object. Therefore, it is necessary to detect and analyze a shadow in an image, and further eliminate or reduce the effect of the shadow as required.

At present, many experts and scholars around the world have conducted intensive research on elimination of shadow in video, and have proposed many effective algorithms. These algorithms are widely applied in fields such as video surveillance and vehicle tracking, but cannot be used to process static images. Shadow detection in a static image has always been a difficult problem, because the static image contains less information, and a shadow therein cannot be detected by using an inter-frame relationship, which is used to detect shadows in video. Meanwhile, in research fields based on a static image, such as remote sensing imaging, after a shadow is detected, influence of the shadow further needs to be reduced or eliminated as far as possible, to recover original features of an object in the shadow, so as to improve the authenticity of an infrared remote sensing image.

At present, there is no related report on detecting a zonal underground structure, such as an underground river or an underground tunnel, by using the infrared imaging technology around the world. A shadow in an infrared remote sensing image increases the false alarm rate in zonal underground structure detection, and reduces the detectivity.

SUMMARY

The present invention provides a zonal underground structure detection method based on sun shadow compensation, which detects a shadow in a single infrared remote sensing image in combination with a Digital Elevation Model (DEM), and compensates the gray scale of an area where the shadow is located, thereby reducing the influence of the shadow on detection.

The present invention provides a zonal underground structure detection method based on sun shadow compensation, including specific steps of:

(1) obtaining latitude and longitude information of an area according to a geographic position of the area, then calculating a latitude step size and a longitude step size according to the resolution of an image, acquiring altitude information of the designated area, and finally correcting the obtained altitude information, where a specific process includes sub-steps of:

(1.1) determining the latitude and longitude of the detected area:

(1.1.1) The latitude and longitude information may be determined according to a position that needs to be detected and the resolution of needed data, where latitude and longitude information of a point at the upper left of the area to be detected is A $(x_1, y_1)$, and latitude and longitude information of a point at the lower right of the area to be detected is B $(x_2, y_2)$.

(1.1.2) It can be learned according to set parameters of the simulated infrared remote sensing image that the resolution of the infrared remote sensing image is k meters, and therefore, the resolution of DEM terrain data also needs to be set as k meters. An actual distance D between any two points on the earth satisfies a certain relationship, as shown in the following relational expression:

$$C=\sin(y_1)*\sin(y_2)*\cos(x_1-x_2)+\cos(y_1)*\cos(y_2)$$

$$D=R*\text{arc } \cos(C)*Pi/180$$

$$R=6371.004$$

Where $(x_1, y_1)$ and $(x_2, y_2)$ in the foregoing formula respectively represent the latitude and longitude information of the two points.

However, we only need to calculate a distance between two points in a direction parallel to the equator and a distance between two points in a direction perpendicular to the equator, and therefore, a relationship between a distance $d_1$ in the direction parallel to the equator and the latitude and longitude is as follows:

$$C=\sin(y_1)^2*\cos(x_1-x_2)+\cos(y_1)^2(y_1=y_2)$$

$$d_1=R*\text{arc } \cos(C)*Pi/180$$

$$R=6371.004$$

$$lon=k*(x_2-x_1)/d_1$$

In the formula, $d_1$ is a distance between two points in the direction parallel to the equator, and lon is a longitude step size.

A relationship between a distance $d_2$ in the direction perpendicular to the equator and the latitude and longitude is as follows:

$$C=\cos(y_1-y_2)(x_1=x_2)$$

$$d_2=R*\text{arc } \cos(C)*Pi/180$$

$$R=6371.004$$

$$lat=k*(y_1-y_2)/d_2$$

In the formula, $d_2$ is a distance between two points in the direction perpendicular to the equator, and lat is a latitude step size.

Latitude and longitude information of each point in the area to be detected is obtained according to the foregoing longitude step size and latitude step size, where the latitude and longitude resolution is k meters.

(1.2) acquiring terrain data of the required area by using Google Earth:

Programming is performed according to the acquired latitude and longitude information by using a programming interface provided by Google Earth. First, positioning is carried out by using Google Earth according to the latitude and longitude information of each point, and then altitude information of the positioned points are obtained after points are successfully positioned. Finally, an altitude information image having the same size as a latitude and longitude image is obtained, where the resolution of the altitude information image is also k meters.

(1.3) correcting the acquired terrain data:

(1.3.1) By observing the acquired altitude information, it is found that there are many singular points. Altitudes at some positions are obviously higher than those of neighboring points. Singular points in altitudes can be obtained by processing the above altitude information image with the following formula, where the singular point and a non-singular point satisfy the following conditions:

if H(i, j)>H(i+k, j+l)+h (k, l=−1,1), (i, j) in the formula is a singular point; and if H(i, j)<H(i+k, j+l)+h (k,l=−1,1), (i, j) in the formula is a non-singular point.

In the formula, H(i, j) is an altitude at the point (i, j), and H(i+k, j+l) is an altitude of a neighboring point of (i, j).

Because median filtering has a desirable processing effect on singular points, the singular points can be removed by performing median filtering processing thereon, thereby obtaining a preliminarily corrected altitude image.

(1.3.2) The preliminarily corrected altitude image is corrected again, and mean filtering processing is performed on the altitude image by using a template having a size of m*m.

The foregoing steps are performed because the obtained area altitude data is not accurate, and the altitude information has certain errors, which cause an adverse effect to subsequent detection. Therefore, the accuracy of the altitude information should be as high as possible. Because the errors occur randomly: sometimes the altitude is higher than an actual altitude, and sometimes the altitude is lower than an actual altitude, the errors are eliminated by using the randomness, where the principle is mainly based on the following formula:

$$\frac{1}{m*m}\sum_{i=1}^{m*m}(H_i+\varepsilon_i) = \frac{1}{m*m}\sum_{i=1}^{m*m}H_i + \frac{1}{m*m}\sum_{i=1}^{m*m}\varepsilon_i$$
$$= \frac{1}{m*m}\sum_{i=1}^{m*m}H_i$$

In the formula, $H_i+\varepsilon_i$ is a read altitude, $H_i$ is an actual altitude, and $\varepsilon_i$ is an altitude error. It can be seen from the foregoing formula that, due to the randomness of the errors, a mean error is $$\frac{1}{m*m}\sum_{i=1}^{m*m}\varepsilon_i \approx 0,$$

and relatively accurate area altitude information data is finally obtained.

(2) rotating the corrected altitude image by using image information such as a solar azimuth angle, calculating a ratio of a mountain body to a mountain projection according to solar altitude angle information, to determine a size and a position of a shadow, and then performing a series of processing to obtain a DEM-based image shadow position, where a specific process mainly includes sub-steps of:

(2.1) rotating the altitude image by using the solar azimuth angle:

The solar azimuth angle θ is determined by using a parameter set when the simulated image is generated, and then the corrected altitude image is rotated by the solar azimuth angle θ. The rotation may be considered as affine transformation from one coordinate system to another coordinate system. To reduce the error caused by rotation, a bilinear interpolation method is used to rotate the image. A calculation formula of the affine transformation is as follows:

$$\text{before rotation:} \begin{cases} x_0 = r\cos\alpha \\ y_0 = r\sin\alpha \end{cases}, \text{ and}$$

$$\text{after rotation:} \begin{cases} x_1 = r\cos(\alpha - \theta) = r\cos\alpha\cos\theta + r\sin\alpha\sin\theta = x_0\cos\theta + y_0\sin\theta \\ y_1 = r\sin(\alpha - \theta) = r\sin\alpha\cos\theta - r\cos\alpha\sin\theta = x_0\sin\theta + y_0\cos\theta \end{cases}$$

An excessive altitude in the finally obtained altitude image after rotation is set as 0.

The solar azimuth angle is an angle between due south and the shadow cast by a vertical rod on the ground.

(2.2) calculating a ratio of a mountain body to a mountain projection, to determine a size and a position of a shadow:

The position of the shadow is also related to the solar altitude angle, because the solar altitude angle determines the ratio of the mountain body to the mountain projection, and this ratio directly determines the size of the shadow. A calculation formula of the solar altitude angle is:

β=90−|Φ(+/−)φ| where Φ represents a local geographical latitude, φ represents a geographical latitude of a subsolar point, (+/−) represents whether the calculated geographical latitude and the geographical latitude of the subsolar point are on the same hemisphere: if the calculated geographical latitude and the geographical latitude of the subsolar point are on the same hemisphere, the symbol is −, and if the calculated geographical latitude and the geographical latitude of the subsolar point are separately on the southern hemisphere and the northern hemisphere, the symbol is +.

The relationship between the mountain body and the mountain shadow is:

$$\text{mountain shadow} = \frac{\text{mountain body}}{\tan\beta}$$

The coverage size of the projection can be obtained according to the foregoing formula, thereby determining the specific size and position of the shadow.

(2.3) detecting and labeling a shadow area:

(2.3.1) The altitude image obtained after rotation is laterally inverted, where specifically, the image obtained after rotation may be traversed from the first column to the middle column according to the following formula, to implement inversion, and a traversing process is as follows:

$$H(:, i) \Leftrightarrow H(:, n-i)\left(i = 1, 2, 3...\frac{2}{n}\right)$$

In the formula, H(:, i) represents all rows of the $i^{th}$ column, n is the number of columns of the altitude image, and ⇔ represents exchanging values before and after the symbol.

The image obtained after rotation is laterally inverted, to ensure that a small mountain is not detected as a non-shadow area when the small mountain is located in a shadow area of a large mountain, thus being equivalent to that the sunlight is cast from east.

(2.3.2) The entire altitude image laterally inverted is traversed from left to right and from top to bottom, to determine, according to the following formula, whether each point in the image is in the shadow area:

$$H'(i, j) \neq 0 \ (i = 1, 2, 3...m, j = 1, 2, 3...n)$$

$$(k - j) * 10 < (H'(i, k) - H'(i, j)) * \frac{1}{\tan\beta} \ (k = j+1, j+2...n)$$

In the formula, H'(i, j) represents the altitude image after rotation and inversion, and m and n respectively represent the number of rows and the number of columns of the altitude image.

A point that satisfies the condition of the foregoing formula is labeled as a shadow area.

(2.3.3) Lateral inversion is performed again on a labeled image that is obtained after processing, and the inverted labeled image is rotated, where an angle for rotation is 360-solar azimuth angle θ. By mapping the size of the labeled image obtained after rotation to the infrared remote sensing image F(x, y) of the mountain body, labeling processing can be performed on the shadow position in the infrared remote sensing image of the mountain body according to the labeled image.

(3) performing dilation processing on the obtained shadow position labeled image, and compensating the dilated shadow area, where a specific process mainly includes sub-steps of:

(3.1) performing dilation processing on the shadow labeled image:

Dilation processing is performed on the obtained labeled image to obtain a continuous area. In the dilation processing, a structure element is moved on the labeled image to perform comparison, and processing is performed according to the comparison result, where a processing procedure is as follows:

a. if no white point (shadow point) in the structure element is the same as a corresponding shadow area pixel thereof in the labeled image, this point is a black point, that is, a non-shadow area; and b. if one point among all white points (shadow points) in the structure element is the same as a corresponding shadow area pixel thereof in the labeled image, this point is a white point, that is, a shadow area.

A dilated labeled image can be obtained after the foregoing processing procedure, in which the discontinuous areas become a continuous area, which is closer to the reality.

(3.2) performing compensation processing on the shadow area:

It is assumed that the image is locally stable, and it can be considered that the shadow area and the non-shadow areas within a certain range nearby have homogeneous geologic structures and similar infrared features. After shadow areas are detected, each independent shadow area is matched with neighboring non-shadow areas thereof, to complete a shadow area compensation operation, achieving an objective of eliminating the shadow. An algorithm process is as follows:

1) for the shadow area, calculating neighboring non-shadow areas thereof according to the following formula:

$$\Omega_{noshadow} = \{p | 0 < d(p, \Omega_{shadow}) < dist\}$$

In the formula, $\Omega_{noshadow}$ represents a set of neighboring non-shadow areas within a distance threshold dist;

2) after obtaining the shadow area and the neighboring non-shadow areas thereof, compensating a gray value of the shadow area according to the following mapping policy:

$$F'_{shadow}(i, j) = A\left[m_{noshadow} + \frac{F_{shadow}(i, j) - m_{shadow}}{\sigma_{shadow}} * \sigma_{noshadow}\right]$$

$$D = F'_{shadow}(i, j) - F_{shadow}(i, j)$$

In the formula, $F_{shadow}(i, j)$ is a gray value of the shadow area before compensation, $F'_{shadow}(i, j)$ is a gray value of the shadow area after compensation, $m_{shadow}$ and $\sigma_{shadow}$ are a mean value and a variance of gray values of the shadow area, $m_{noshadow}$ and $\sigma_{noshadow}$ are a mean value and a variance of gray values of the neighboring non-shadow areas, A is a compensation intensity coefficient, and D is a compensation value needed by the shadow area; and traversing all detected shadow areas after obtaining D needed for gray value compensation, and compensating a gray value of each point, which corresponds to the shadow area, in the infrared remote sensing image for D, to obtain a finally compensated infrared remote sensing image.

(4) performing preliminary detection and identification on the infrared remote sensing image in which the shadow area has been compensated, and then performing a secondary judgment by using position correlation, to improve an identification rate and reduce a false alarm rate, where a specific process includes sub-steps of:

(4.1) preliminarily determining the position of the zonal underground structure:

detecting the zonal underground structure by using the infrared remote sensing image in which the shadow has been compensated, moving pixel by pixel on the thermal infrared remote sensing image to perform detection and identification section by section according to an approximate position and direction information of a tunnel, where each section has a length of 250 meters and a width of 30 meters (that is, a length of 25 pixels and a width of 3 pixels), and traversing pixels from left to right to detect whether the zonal underground structure exists, so as to finally obtain a preliminary tunnel identification result; and at the same time, detecting the underground structure in a direction perpendicular to the tunnel by using the same method, to calculate a false alarm rate; and (4.2) performing a secondary judgment according to position correlation:

performing statistical analysis on preliminarily identified disperse sections that meet a pulse pattern, and judging, according to occurrence probabilities and a position dispersion degree of the disperse sections within a segment having a length of 500 meters (50 pixels), whether small blanks between disperse neighboring sections that meet the pulse pattern can be ignored.

1) If it is judged that the small blanks between these disperse pulse pattern sections can be ignored, it is confirmed that the length segment of 500 meters is a position where the zonal target is located.

2) If it is judged that the small blanks between these disperse pulse pattern sections cannot be ignored, it is confirmed that the length segment of 500 meters is not a position where the zonal target is located.

Compared with the prior art, the present invention has the following beneficial effects:

1. A sunlight shadow area in a static infrared image can be detected effectively by using acquired useful information, such as DEM terrain data of a designated area, a solar azimuth angle, and a solar altitude angle, and certain compensation processing is performed on the shadow area by using knowledge such as homogeneous geologic structures and similar infrared features of the shadow area and non-shadow areas thereof within a certain range nearby, which can reduce the adverse effect of the shadow on underground structure detection.

2. An underground structure is detected by using a result image after sun shadow compensation. Compared with underground structure detection using an infrared image without shadow compensation, the accuracy of underground structure detection can be improved, and the false alarm rate can be reduced.

BRIEF DESCRIPTION OF THE DRAWINGS

FIG. 10(a) is an infrared remote sensing image of an area of a simulated tunnel 1 in an embodiment of the present invention;

FIG. 10(b) is a shadow compensated infrared remote sensing image of an area of a simulated tunnel 1 in an embodiment of the present invention;

FIG. 11(a) is an infrared remote sensing image of an area of a simulated tunnel 2 in an embodiment of the present invention;

FIG. 11(b) is a shadow compensated infrared remote sensing image of an area of a simulated tunnel 2 in an embodiment of the present invention;

DETAILED DESCRIPTION

For clearer understanding of the objectives, technical solutions and advantages of the present invention, detailed description of the present invention will be given below in conjunction with accompanying drawings and embodiments. It should be noted that the specific embodiments described herein are only meant to explain the present invention, and not to limit the present invention. Furthermore, the technical features involved in the embodiments of the present invention as described below could be combined with each other as long as no conflict is caused.

Figure 1:
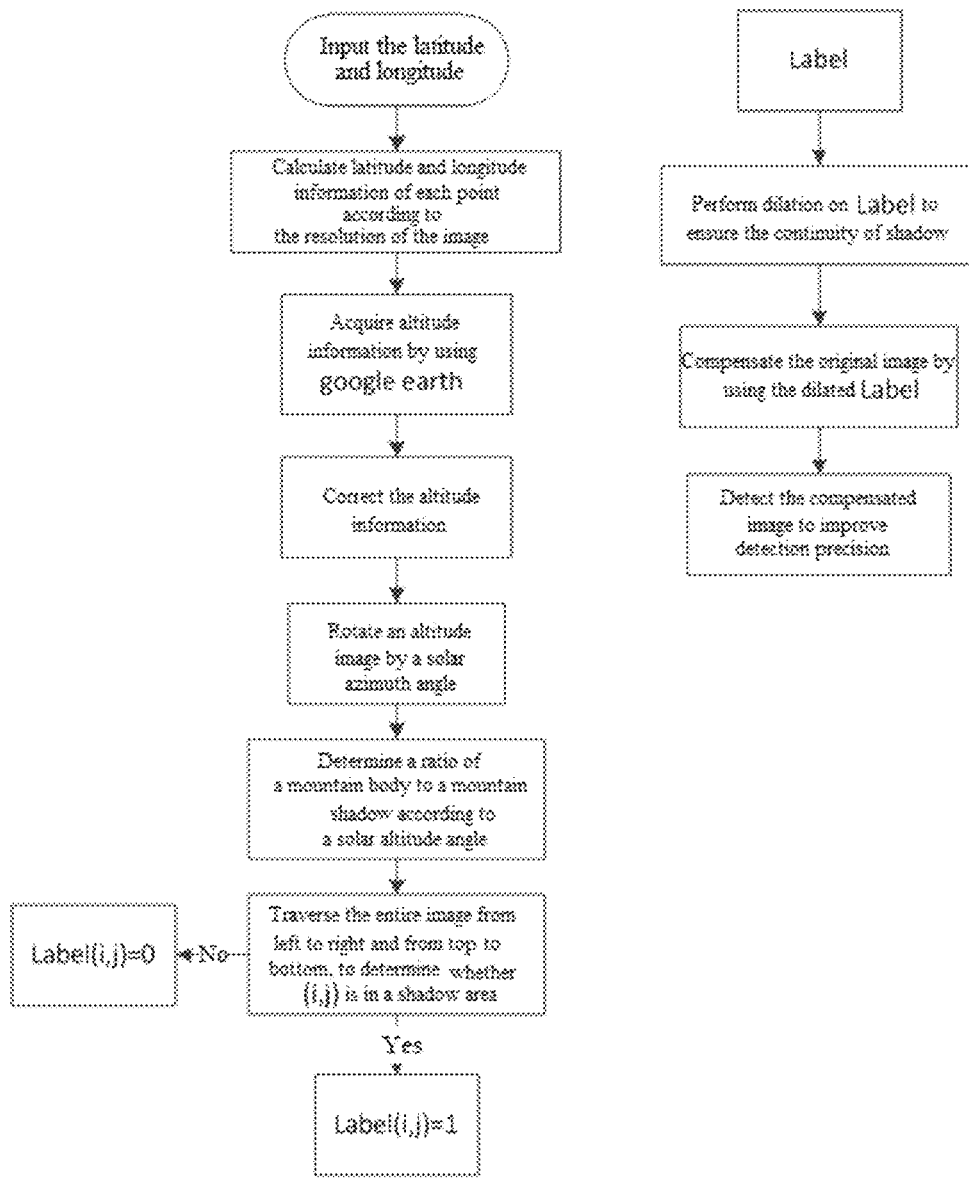
FIG. 1 is a schematic flow chart of a zonal underground structure detection method based on sun shadow compensation according to the present invention.
Figure 2:
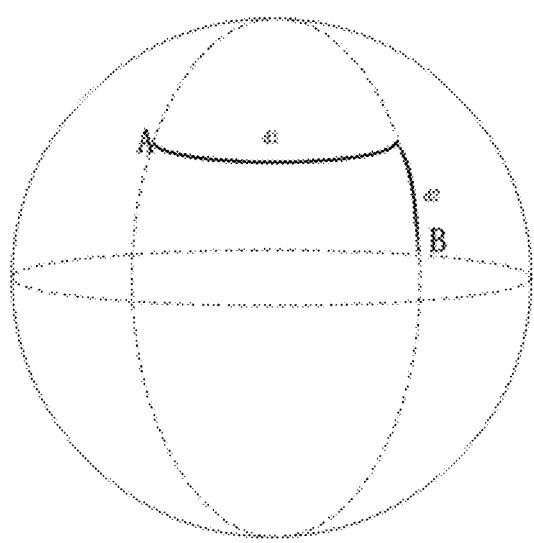
FIG. 2 is a schematic view of the latitude and longitude, and distances in an embodiment of the present invention.

The flow of the present invention is shown in FIG. 1, where a specific implementation method includes steps of: acquiring DEM terrain data of a designated area; acquiring an image shadow position by using the DEM, a solar altitude angle, and a solar azimuth angle; processing and compensating a shadow area; and detecting a zonal underground structure after the shadow area is corrected:

(1) obtaining latitude and longitude information of an area according to a geographic position of the area, then calculating a latitude step size and a longitude step size according to the resolution of an image, acquiring altitude information of the designated area, and finally correcting the obtained altitude information, where a specific process includes sub-steps of:

(1.1) determining the latitude and longitude of the designated area:

(1.1.1) The latitude and longitude information may be determined according to a position that needs to be detected and the resolution of needed data, As shown in FIG. 2, in this embodiment, latitude and longitude information of a point at the upper left of the area to be detected is $A(x_1, y_1) = (116.150049, 40.296833)$, and latitude and longitude information of a point at the lower right of the area to be detected is $B(x_2, y_2) = (116.194775, 40.260787)$.

(1.1.2) The resolution of the simulated infrared remote sensing image is k meters, and the resolution of the DEM terrain data also needs to be set as k meters. An actual distance d between any two points on the earth satisfies a certain relationship, as shown in the following relational expression:

$$C = \sin(y_1) * \sin(y_2) * \cos(x_1 - x_2) + \cos(y_1) * \cos(y_2)$$

$$D = R * \text{arc } \cos(C) * Pi/180$$

$$R = 6371.004$$

$(x_1, y_1)$ and $(x_2, y_2)$ in the foregoing formula respectively represent the latitude and longitude information of the two points.

Therefore, as shown in FIG. 2, a relationship between a distance $d_1$ in a direction parallel to the equator and the latitude and longitude is as follows:

$$C = \sin(y_1)^2 * \cos(x_1 - x_2) + \cos(y_1)^2 (y_1 = y_2)$$

$$d_1 = R * \text{arc } \cos(C) * Pi/180$$

$$R = 6371.004$$

$$lon = k * (x_2 - x_1)/d_1$$

In this embodiment, $d_1 = 3800$ m, and $lon = 0.0001177$.

A relationship between a distance $d_2$ in a direction perpendicular to the equator and the latitude and longitude is as follows:

$$C=\cos(y_1-y_2)(x_1=x_2)$$

$$d_2=R*\text{arc }\cos(C)*Pi/180$$

$$R=6371.004$$

$$lat=k*(y_1-y_2)/d_2$$

In this embodiment, $d_2=4000$ m, and $lat=0.000090115$.

(1.2) acquiring terrain data of the required area by using Google Earth:

Programming is performed according to the acquired latitude and longitude information by using a programming interface provided by Google Earth. First, positioning is carried out by using Google Earth according to the latitude and longitude information of each point, and then altitude information of the positioned points are obtained after points are successively positioned. Finally, an altitude information image having the same size as a latitude and longitude image is obtained, where the resolution of the altitude information image is also k meters.

Figure 3:
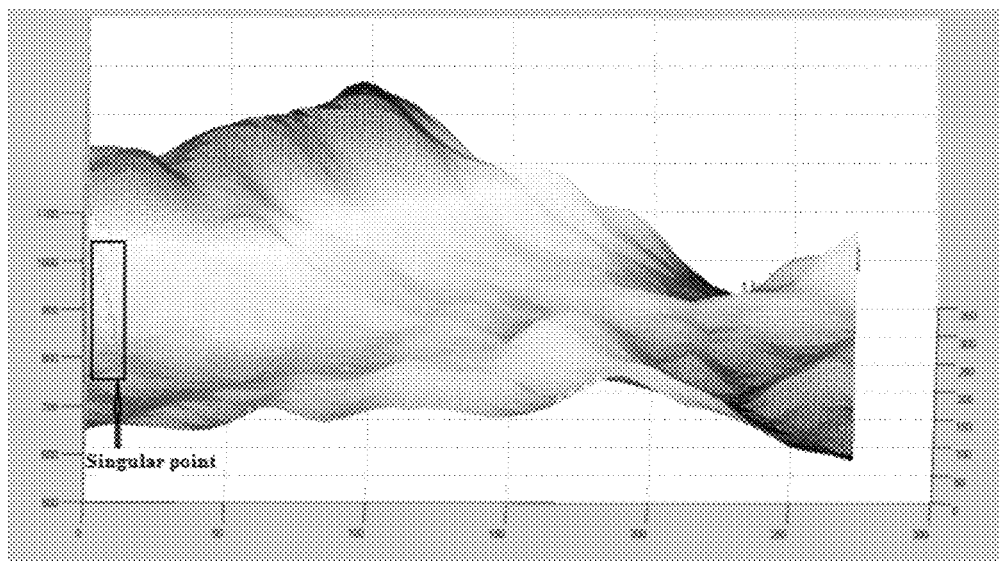
FIG. 3 is an altitude image before singular points are processed in an embodiment of the present invention.

(1.3) correcting the terrain data:

(1.3.1) As shown in FIG. 3, by observing the altitude information in FIG. 3, it is found that there are many singular points. Altitudes at some positions are obviously higher than those of neighboring points. To reduce errors, a point is compared with neighboring points to determine whether it is a singular point, where the singular point and a non-singular point satisfy the following conditions:

if $H(i, j)>H(i+k, j+l)+h(k,i=-1,1)$, $(i, j)$ in the formula is a singular point, and if $H(i, j)<H(i+k, j+l)+h(k,l=-1,1)$, $(i, j)$ in the formula is a non-singular point.

In the formula, $H(i, j)$ is an altitude at the point $(i, j)$, and $H(i+k, j+l)$ is an altitude of a neighboring point of $(i, j)$. In this embodiment, h is 20.

Figure 4:
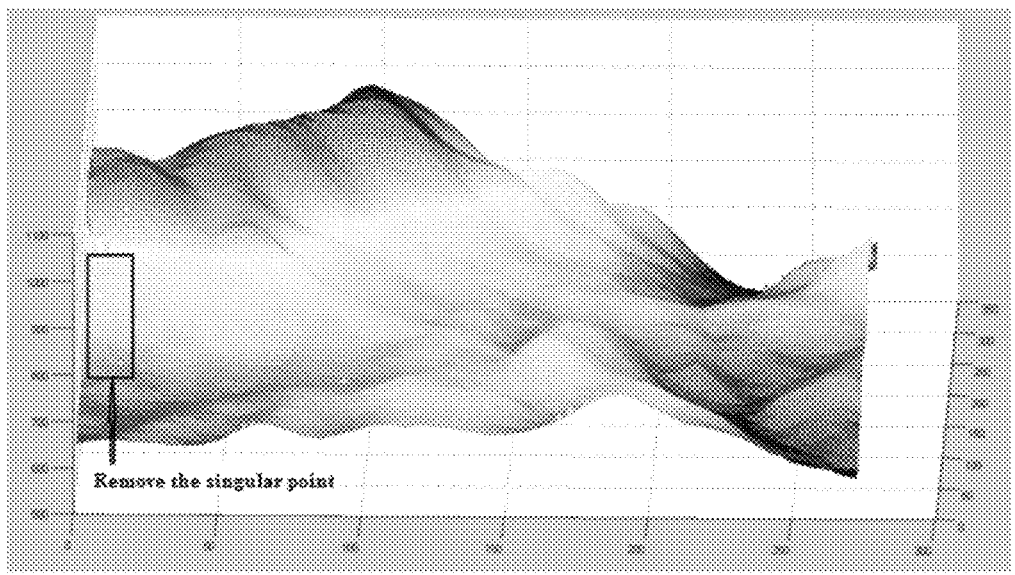
FIG. 4 is an altitude image after singular points are processed in an embodiment of the present invention.

Because median filtering has a desirable processing effect on singular points, the singular points can be removed by performing median filtering processing thereon, thereby obtaining a preliminarily corrected altitude image. The result is shown in FIG. 4.

(1.3.2) correcting the preliminarily corrected altitude image again, and performing mean filtering processing on the altitude image by using a template having a size of m*m.

The foregoing steps are performed because the obtained area altitude data is not accurate, and the altitude information has certain errors, which cause an adverse effect to subsequent detection. Therefore, the accuracy of the altitude information should be as high as possible. Because the errors occur randomly: sometimes the altitude is higher than an actual altitude, and sometimes the altitude is lower than an actual altitude, the errors are eliminated by using the randomness, where the principle is mainly based on the following formula:

$$\frac{1}{m*m}\sum_{i=1}^{m*m}(H_i+\varepsilon_i) = \frac{1}{m*m}\sum_{i=1}^{m*m}H_i + \frac{1}{m*m}\sum_{i=1}^{m*m}\varepsilon_i$$

$$= \frac{1}{m*m}\sum_{i=1}^{m*m}H_i$$

In the formula, $H_i+\varepsilon_i$ is a read altitude, is an actual altitude, and $\varepsilon_i$ is an altitude error. It can be seen from the foregoing formula that, due to the randomness of the errors, a mean error is $$\frac{1}{m*m}\sum_{i=1}^{m*m}\varepsilon_i \approx 0,$$

and relatively accurate area altitude information data is finally obtained. In this embodiment, m is 5.

Figure 5:
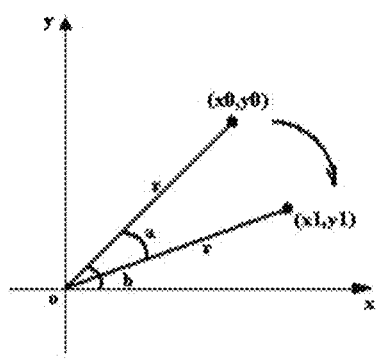
FIG. 5 is a schematic view of an altitude rotation process in an embodiment of the present invention.
Figure 6:
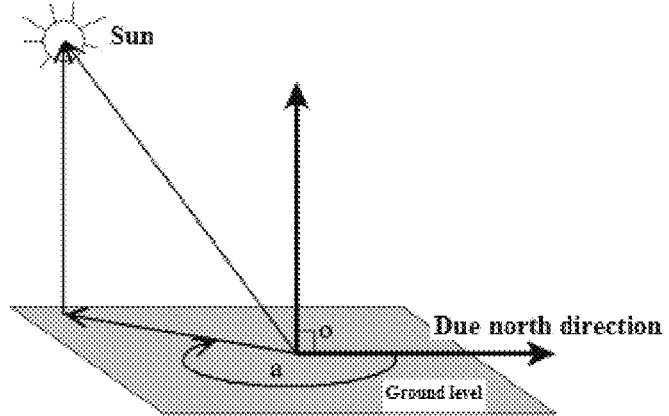
FIG. 6 is a schematic view of a solar azimuth angle in an embodiment of the present invention.

(2) rotating the corrected altitude image by using image information such as a solar azimuth angle, calculating a ratio of a mountain body to a mountain projection according to image information such as the solar altitude angle, and then performing a series of processing to obtain a DEM-based image shadow position, where a specific process mainly includes sub-steps of:

(2.1) rotating the altitude image by using the solar azimuth angle:

The solar azimuth angle θ is determined by using a parameter set when the simulated image is generated, where the solar azimuth angle is as shown in FIG. 6; and then the corrected altitude image is rotated by the solar azimuth angle θ. As shown in FIG. 5, the rotation may be considered as affine transformation from one coordinate system to another coordinate system. To reduce the error caused by rotation, a bilinear interpolation method is used to rotate the image. A calculation formula of the affine transformation is as follows:

$$\text{before rotation:}\begin{cases} x_0 = r\cos\alpha \\ y_0 = r\sin\alpha \end{cases}, \text{and}$$

after $$\text{rotation:}\begin{cases} x_1 = r\cos(\alpha-\theta) = r\cos\alpha\cos\theta + r\sin\alpha\sin\theta = x_0\cos\theta + y_0\sin\theta \\ y_1 = r\sin(\alpha-\theta) = r\sin\alpha\cos\theta - r\cos\alpha\sin\theta = -x_0\sin\theta + y_0\cos\theta \end{cases}$$

An excessive altitude in the finally obtained altitude image after rotation is set as 0.

The solar azimuth angle is an angle between due south and the shadow cast by a vertical rod on the ground. In this embodiment, the solar azimuth angle θ=234.65.

Figure 7:
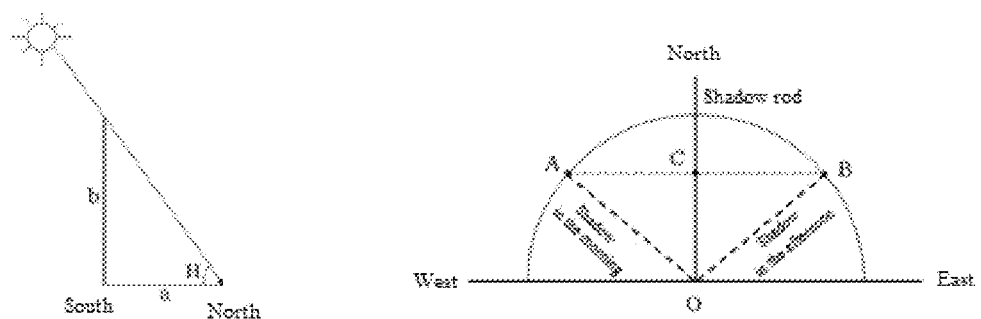
FIG. 7 is a schematic view of a solar altitude angle in an embodiment of the present invention.

(2.2) calculating a ratio of a mountain body to a mountain projection:

The position of the shadow is also related to the solar altitude angle, because the solar altitude angle determines the ratio of the mountain body to the mountain projection, and this ratio directly determines the size of the shadow. As shown in FIG. 7, a calculation formula of the solar altitude angle is:

$$\beta+90-|\Phi(+/-)\phi|$$

Φ represents a local geographical latitude, φ represents a geographical latitude of a subsolar point, and (+/−) represents whether the calculated geographical latitude and the geographical latitude of the subsolar point are on the same hemisphere: if the calculated geographical latitude and the geographical latitude of the subsolar point are on the same hemisphere, the symbol is −, and if the calculated geographical latitude and the geographical latitude of the subsolar point are separately on the southern hemisphere and the northern hemisphere, the symbol is +. In this embodiment, the geographical latitude and the latitude of the subsolar point are on the same hemisphere, and the following can be obtained: β=29.

The relationship between the mountain body and the mountain shadow is:

$$\text{mountain shadow} = \frac{\text{mountain body}}{\tan\beta}$$

The coverage size of the projection can be obtained according to the foregoing formula, thereby determining the specific size and position of the shadow. In this embodiment, tan β=0.554.

(2.3) detecting and labeling a shadow area:

(2.3.1) laterally inverting the altitude image obtained after rotation, where specifically, the image obtained after rotation may be traversed from the first column to the middle column according to the following formula, to implement inversion, and a traversing process is as follows:

$$H(:,i) \Leftrightarrow H(:,n-i)\left(i = 1, 2, 3 \ldots \frac{2}{n}\right)$$

In the formula, H(:, i) represents all rows of the $i^{th}$ column, n is the number of columns of the altitude image, and ⇔ represents exchanging values before and after the symbol.

The image obtained after rotation is laterally inverted, to ensure that a small mountain is not detected as a non-shadow area when the small mountain is located in a shadow area of a large mountain, thus being equivalent to that the sunlight is cast from east.

(2.3.2) traversing the entire altitude image laterally inverted from left to right and from top to bottom, to determine, according to the following formula, whether each point in the image is in the shadow area:

$$H'(i, j) \neq 0 \ (i = 1, 2, 3 \ldots m, j = 1, 2, 3 \ldots n)$$

$$(k - j) * 10 < (H'(i, k) - H'(i, j)) * \frac{1}{\tan\beta} \ (k = j + 1, j + 2 \ldots n)$$

In the formula, H'(i, j) represents the altitude image after rotation and inversion, and m and n respectively represent the number of rows and the number of columns of the altitude image.

A point that satisfies the condition of the foregoing formula is labeled as a position of the shadow area:

label(i, j)=1

Figures 8A, 8B:
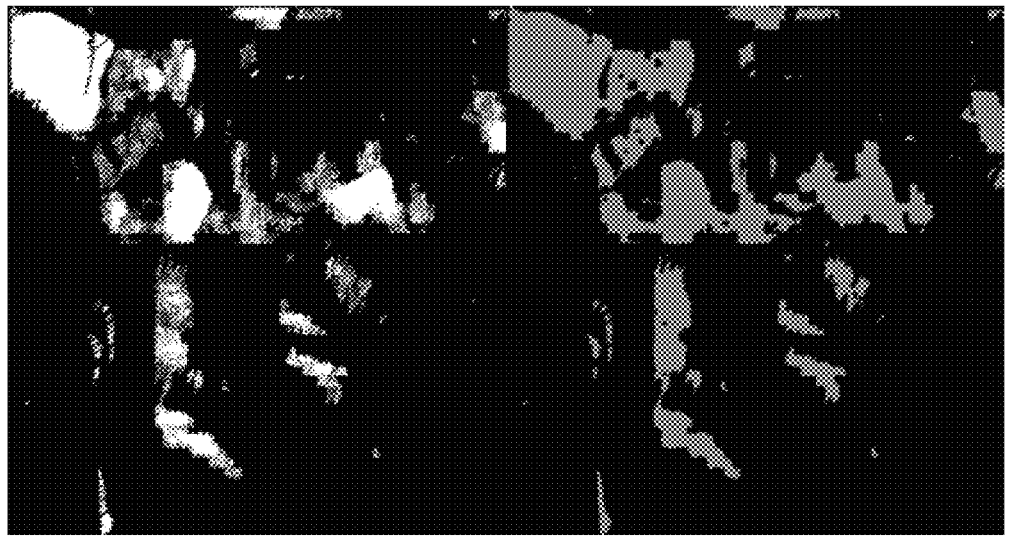
FIG. 8(a) is a shadow labeled image of an area of a simulated tunnel 1 in an embodiment of the present invention.
FIG. 8(b) is a shadow labeled dilation image of an area of a simulated tunnel 1 in an embodiment of the present invention.
Figures 9A, 9B:
FIG. 9(a) is a shadow labeled image of an area of a simulated tunnel 2 in an embodiment of the present invention.
FIG. 9(b) is a shadow labeled dilation image of an area of a simulated tunnel 2 in an embodiment of the present invention.

(2.3.3) performing lateral inversion again on a labeled image that is obtained after processing, and rotating the inverted labeled image, where an angle for rotation is 360-solar azimuth angle θ. By mapping the size of the labeled image obtained after rotation to the infrared remote sensing image F(x, y) of the mountain body, labeling processing can be performed on the shadow position in the infrared remote sensing image of the mountain body according to the labeled image. In this embodiment, the rotation angle is 125.35. FIG. 8(a) and FIG. 9(a) respectively show an altitude shadow labeled image of a simulated image 1 after rotation and an altitude shadow labeled image of a simulated image 2 after rotation.

(3) performing dilation processing on the obtained shadow position labeled image, and compensating the dilated shadow area, where a specific process mainly includes sub-steps of:

(3.1) performing dilation processing on the shadow labeled image:

Dilation processing is performed on the labeled image to obtain a continuous area. In the dilation processing, a structure element is moved on the labeled image to perform comparison, and processing is performed according to the comparison result, where a processing procedure is as follows:

a. if no white point (shadow point) in the structure element is the same as a corresponding shadow area pixel thereof in the labeled image, this point is a black point, that is, a non-shadow area; and b. if one point among all white points (shadow points) in the structure element is the same as a corresponding shadow area pixel thereof in the labeled image, this point is a white point, that is, a shadow area.

A dilated labeled image can be obtained after the foregoing processing procedure, in which the discontinuous areas become a continuous area, which is closer to the reality. FIG. 8(b) and FIG. 9(b) are respectively a view showing a result after dilation processing is performed on the shadow labeled image of the simulated image 1 and a view showing a result after dilation processing is performed on the shadow labeled image of the simulated image 2.

(3.2) compensating the shadow area:

It is assumed that the image is locally stable, and it can be considered that the shadow area and the non-shadow areas within a certain range nearby have homogeneous geologic structures and similar infrared features. As shown in FIG. 10(a) and FIG. 11(a), the area of simulated tunnel 1 and the area of simulated tunnel 2 have an obvious shadow distribution. Therefore, after shadow areas are detected, each independent shadow area is matched with neighboring non-shadow areas thereof, to complete a shadow area compensation operation, achieving an objective of eliminating the shadow. An algorithm process is as follows:

1) for the shadow area, calculating neighboring non-shadow areas thereof according to the following formula:

$$\Omega_{noshadow} = \{p \mid 0 < d(p, \Omega_{shadow}) < \text{dist}\}$$

In the formula, $\Omega_{noshadow}$ represents a set of neighboring non-shadow areas within a distance threshold dist, where dist=50.

2) after obtaining the shadow area and the neighboring non-shadow areas thereof, compensating a gray value of the shadow area according to the following mapping policy:

$$F'_{shadow}(i, j) = A\left[m_{noshadow} + \frac{F_{shadow}(i, j) - m_{shadow}}{\sigma_{shadow}} * \sigma_{noshadow}\right]$$

$$D = F'_{shadow}(i, j) - F_{shadow}(i, j)$$

In the formula, $F_{shadow}(i, j)$ is a gray value of the shadow area before compensation, $F'_{shadow}(i, j)$ is a gray value of the shadow area after compensation, $m_{shadow}$ and $\sigma_{shadow}$ are a mean value and a variance of gray values of the shadow area, $m_{noshadow}$ and $\sigma_{noshadow}$ are a mean value and a variance of gray values of the neighboring non-shadow areas, A is a compensation intensity coefficient, and D is a compensation value needed by the shadow area. In this embodiment, $m_{shadow}$=1465, $m_{noshadow}$=1503, $\sigma_{shadow}$=55.2752, $\sigma_{noshadow}$=61.9714, D=44, and A=1.0.

All detected shadow areas are traversed after obtaining D needed for gray value compensation, and a gray value of each point, which corresponds to the shadow area, in the infrared remote sensing image is compensated for D, to obtain a finally compensated gray scale image. FIG. 10(b) and FIG. 11(b) respectively show a shadow compensated infrared remote sensing image of an area of a simulated tunnel 1 and a shadow compensated infrared remote sensing image of an area of a simulated tunnel 2. It can be seen from the obtained infrared remote sensing image that the shadow is eliminated in certain degree.

(4) performing preliminary detection and identification on the infrared remote sensing image in which the shadow area has been compensated, and then performing a secondary judgment by using position correlation, to improve an identification rate and reduce a false alarm rate, where a specific process includes sub-steps of:

(4.1) preliminarily determining the position of the zonal underground structure:

detecting the zonal underground structure by using the infrared remote sensing image in which the shadow has been compensated, moving pixel by pixel on the thermal infrared remote sensing image to perform detection and identification section by section according to an approximate position and direction information of a tunnel, where each section has a length of 250 meters and a width of 30 meters (that is, a length of 25 pixels and a width of 3 pixels), and traversing pixels from left to right to detect whether the zonal underground structure exists, so as to finally obtain a preliminary tunnel identification result; and at the same time, detecting the underground structure in a direction perpendicular to the tunnel by using the same method, to calculate a false alarm rate.

(4.2) performing a secondary judgment according to position correlation:

performing statistical analysis on preliminarily identified disperse sections that meet a pulse pattern, and judging, according to occurrence probabilities and a position dispersion degree of the disperse sections within a segment having a length of 500 meters (50 pixels), whether small blanks between disperse neighboring sections that meet the pulse pattern can be ignored.

1) If it is judged that the small blanks between these disperse pulse pattern sections can be ignored, it is confirmed that the length segment of 500 meters is a position where the zonal target is located.

2) If it is judged that the small blanks between these disperse pulse pattern sections cannot be ignored, it is confirmed that the length segment of 500 meters is not a position where the zonal target is located.

Figures 12A, 12B:
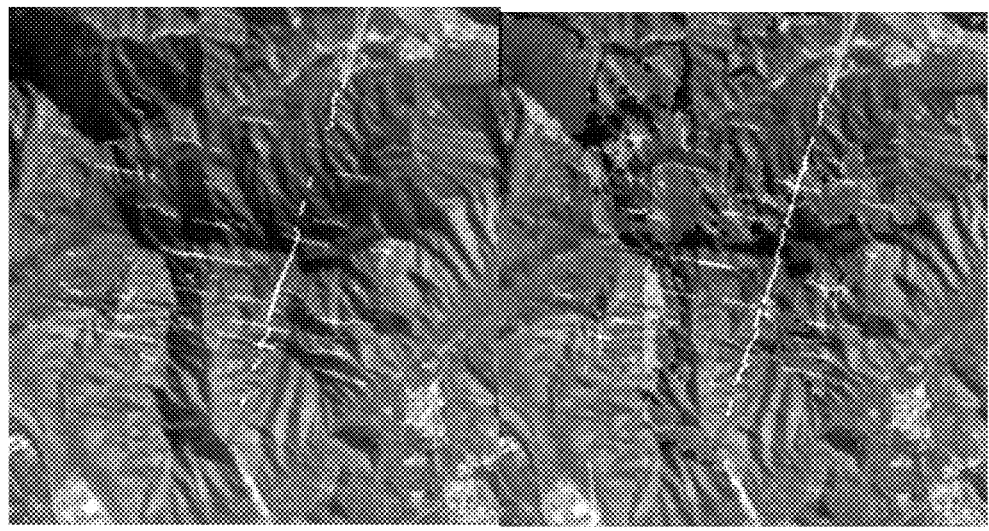
FIG. 12(a) is a view showing a detection result of a simulated tunnel 1 without shadow compensation in an embodiment of the present invention.
FIG. 12(b) is a view showing a detection result of a simulated tunnel 1 after shadow compensation in an embodiment of the present invention.

As shown in FIG. 12(a) and FIG. 12(b), by comparing the two figures, it can be seen that the detection result of the zonal underground structure in an image after shadow compensation is better than the detection result without compensation.

The following comparison table is obtained by performing detection and identification on infrared remote sensing images before and after the shadow is eliminated. It can be seen that, after the shadow is eliminated, the identification rate is improved, and at the same time, the false alarm rate is reduced. The table is shown as follows:

|  | Identification rate before influence of the shadow is eliminated | Identification rate after influence of the shadow is eliminated | False alarm rate before influence of the shadow is eliminated | False alarm rate after influence of the shadow is eliminated |
| --- | --- | --- | --- | --- |
| Simulated tunnel 1 | 60.9% | 80.86% | 22% | 20% |
| Simulated tunnel 2 | 90% | 91% | 24.7% | 21.3% |

While preferred embodiments of the present invention have been described above, it will be obvious to those skilled in the art that the present invention is not limited to the preferred embodiments. Any modifications, equivalent changes, and improvements without departing from the spirit and principle of the present invention should all fall within the protection scope of the present invention.

The invention claimed is:

1. A zonal underground structure detection method based on sun shadow compensation, wherein the method comprises steps of:

(1) determining latitude and longitude information of an area to be detected according to a geographic position of the area to be detected, then calculating a latitude step size and a longitude step size according to the resolution of an infrared remote sensing image, acquiring altitude information of the area to be detected according to the latitude and longitude information and the latitude step size and longitude step size of the area to be detected, and finally correcting the obtained altitude information to generate a corrected altitude image;

(2) rotating the corrected altitude image by using solar azimuth angle information, calculating a ratio of a mountain body to a mountain shadow according to solar altitude angle information, determining a size and a position of a shadow in the altitude image, and processing the rotated altitude image to obtain a shadow position labeled image;

(3) performing dilation processing on the obtained shadow position labeled image, and compensating a dilated shadow area; and (4) performing preliminary detection and identification on the infrared remote sensing image in which the shadow area has been compensated, and then performing a secondary judgment by using position correlation, to detect a zonal underground structure.

2. The method of claim 1, wherein the determining latitude and longitude information of an area to be detected according to a geographic position of the area to be detected, and then calculating a latitude step size and a longitude step size according to the resolution of an infrared remote sensing image in step (1) specifically comprises sub-steps of:

(1.1.1) obtaining, according to the geographic position of the area to be detected, latitude and longitude information $A(x_1, y_1)$ of a point at the upper left of the area to be detected, and latitude and longitude information $B(x_2, y_2)$ of a point at the lower right of the area to be detected; and (1.1.2) obtaining the resolution, which is k meters, of the infrared remote sensing image, and respectively calculating the longitude step size lon and the latitude step size lat according to the following formulas:

$$C=\sin(y_1)^2 *\cos(x_1-x_2)+\cos(y_1)^2(y_1=y_2)$$

$$d_1=R*\text{arc }\cos(C)*Pi/180$$

$$R=6371.004$$

$$lon=k*(x_2-x_1)/d_1$$

$$C=\cos(y_1-y_2)(x_1=x_2)$$

$$d_2=R*\arccos(C)*Pi/180$$

$$R=6371.004$$

$$lat=k*(y_1-y_2)/d_2$$

3. The method of claim 1, wherein the acquiring altitude information of the area to be detected according to the latitude and longitude information and the latitude step size and longitude step size of the area to be detected in step (1) is specifically: obtaining latitude and longitude information of each point in the area to be detected according to the latitude and longitude information and the latitude step size and longitude step size of the area to be detected, performing positioning in Google Earth according to the latitude and longitude information of each point, and then acquiring altitude information of each positioned point, to obtain an altitude information image having the same size as a latitude and longitude information image, wherein the resolution of the altitude information image is also k meters.

4. The method of claim 1, wherein the correcting the obtained altitude information in step (1) specifically comprises:
(1.3.1) processing the altitude information image by using the following formulas to obtain a singular point in altitudes, wherein the singular point and a non-singular point satisfy the following conditions:
if H(i, j)>H(i+k, j+l)+h (k,l=−1,1), (i,j) in the formula is a singular point, and
if H(i, j)<H(i+k, j+l)+h (k,l=−1,1), (i, j) in the formula is a non-singular point,
wherein H(i, j) in the formula is an altitude of point (i, j), and H(i+k, j+l) is an altitude of a neighboring point of (i, j); and
performing median filtering processing on the singular point to remove the singular point, to obtain a preliminarily corrected altitude image;
(1.3.2) performing mean filtering on the preliminarily corrected altitude image by using an m*m-sized template, to correct the altitude image again.

5. The method of claim 1, wherein the rotating the corrected altitude image by using solar azimuth angle information in step (2) specifically comprises:
determining a solar azimuth angle θ, and rotating the corrected altitude image by the solar azimuth angle θ, wherein a transformation formula is as follows:

$$\text{before rotation}:\begin{cases} x_0 = r\cos\alpha \\ y_0 = r\sin\alpha \end{cases}$$

after rotation:

$$\begin{cases} x_1 = r\cos(\alpha-\theta) = r\cos\alpha\cos\theta + r\sin\alpha\sin\theta = x_0\cos\theta + y_0\sin\theta \\ y_1 = r\sin(\alpha-\theta) = r\sin\alpha\cos\theta - r\cos\alpha\sin\theta = -x_0\sin\theta + y_0\cos\theta \end{cases}; \text{and}$$

setting an excessive altitude in the altitude image obtained after rotation as 0, wherein the solar azimuth angle is an angle between due south and the shadow cast by a vertical rod on the ground.

6. The method of claim 1, wherein the calculating a ratio of a mountain body to a mountain shadow according to solar altitude angle information, and determining a size and a position of a shadow in the altitude image in step (2) specifically comprises:
calculating a solar altitude angle according to the formula β=90−|Φ(+/−)φ|, wherein Φ presents a local geographical latitude, φ represents a geographical latitude of a subsolar point, (+/−) represents whether the calculated geographical latitude and the geographical latitude of the subsolar point are on the same hemisphere: if the calculated geographical latitude and the geographical latitude of the subsolar point are on the same hemisphere, the symbol is −, and if the calculated geographical latitude and the geographical latitude of the sub solar point are separately on the southern hemisphere and the northern hemisphere, the symbol is +; and
calculating the size and position of the shadow according to a relationship between the mountain shadow and the mountain body:

$$\text{mountain shadow} = \frac{\text{mountain body}}{\tan\beta}.$$

7. The method of claim 1, wherein the processing the rotated altitude image to obtain a shadow position labeled image in step (2) specifically comprises:
(2.3.1) laterally inverting the altitude image obtained after rotation, wherein specifically, the image obtained after rotation can be traversed from the first column to the middle column according to the following formula, to implement inversion, and a traversing process is as follows:

$$H(:, i) \Leftrightarrow H(:, n-i)\left(i=1, 2, 3...\frac{2}{n}\right)$$

wherein in the formula, H(:, i) represents all rows of the $i^{th}$ column, n is the number of columns of the altitude image, and ⇔ represents exchanging values before and after the symbol;
(2.3.2) traversing the entire altitude image laterally inverted from left to right and from top to bottom, to determine, according to the following formula, whether each point is in a shadow area:

$$H'(i, j) \neq 0 \ (i=1, 2, 3...m, \ j=1, 2, 3...n)$$

$$(k-j)*10 < (H'(i, k) - H'(i, j))*\frac{1}{\tan\beta} \ (k=j+1, j+2...n)$$

wherein in the formula, H'(i, j) represents the altitude image after rotation and inversion, m and n respectively represent the number of rows and the number of columns of the altitude image, and a point that satisfies the condition of the foregoing formula is labeled as a shadow area; and
(2.3.3) performing lateral inversion again on a labeled image obtained after processing, and rotating the inverted labeled image, wherein a rotation angle is 360-solar azimuth angle θ, to obtain the shadow position labeled image.

8. The method of claim 1, wherein the performing dilation processing on the obtained shadow position labeled image in step (3) specifically comprises:
    performing dilation processing on the obtained shadow position labeled image to obtain a continuous area, wherein the dilation processing is specifically moving a structure element on the labeled image to perform comparison, and performing processing according to the comparison result, a processing procedure being:
    a. if no shadow point in the structure element is the same as a corresponding shadow area pixel thereof in the labeled image, this point is a black point, that is, a non-shadow area; and
    b. if one point among all shadow points in the structure element is the same as a corresponding shadow area pixel thereof in the labeled image, this point is a white point, that is, a shadow area.

9. The method of claim 1, wherein the compensating the dilated shadow area in step (3) specifically comprises:
    1) for the shadow area, calculating neighboring non-shadow areas thereof according to the following formula:

$$\Omega_{noshadow} = \{p | 0 < d(p, \Omega_{shadow}) < \text{dist}\}$$

wherein $\Omega_{noshadow}$ in the formula represents a set of neighboring non-shadow areas within a distance threshold dist;
    2) after obtaining the shadow area and the neighboring non-shadow areas thereof, compensating a gray value of the shadow area by using the following mapping policy:

$$F'_{shadow}(i, j) = A\left[m_{noshadow} + \frac{F_{shadow}(i, j) - m_{shadow}}{\sigma_{shadow}} * \sigma_{noshadow}\right]$$

$$D = F'_{shadow}(i, j) - F_{shadow}(i, j)$$

wherein in the formula, $F_{shadow}(i, j)$ is a gray value of the shadow area before compensation, $F'_{shadow}(i, j)$ is a gray value of the shadow area after compensation, $m_{shadow}$ and $\sigma_{shadow}$ are a mean value and a variance of gray values of the shadow area, $m_{noshadow}$ and $\sigma_{noshadow}$ are a mean value and a variance of gray values of the neighboring non-shadow areas, A is a compensation intensity coefficient, and D is a compensation value needed by the shadow area; and
    traversing all detected shadow areas after obtaining D needed for gray value compensation, and compensating a gray value of each point, which corresponds to the shadow area, in the infrared remote sensing image for D, to obtain a finally compensated infrared remote sensing image.

10. The method of claim 1, wherein step (4) specifically comprises:
    (4.1) preliminarily determining the position of the zonal underground structure:
    detecting the zonal underground structure by using the infrared remote sensing image in which the shadow has been compensated, moving pixel by pixel on the thermal infrared remote sensing image to perform detection and identification section by section according to an approximate position and direction information of a tunnel, and traversing pixels from left to right to detect whether the zonal underground structure exists, so as to finally obtain a preliminary tunnel identification result; and at the same time, detecting the underground structure in a direction perpendicular to the tunnel by using the same method, to calculate a false alarm rate; and
    (4.2) performing a secondary judgment according to position correlation:
    performing statistical analysis on preliminarily identified disperse sections that meet a pulse pattern, judging, according to occurrence probabilities and a position dispersion degree of the disperse sections within a segment of a preset length, whether small blanks between disperse neighboring sections that meet the pulse pattern can be ignored: if it is judged that the small blanks between these disperse pulse pattern sections can be ignored, confirming that the segment of the preset length is a position where the zonal target is located; if it is judged that the small blanks between these disperse pulse pattern sections cannot be ignored, confirming that the segment of the preset length is not a position where the zonal target is located.

* * * * *